United States Patent [19]

Meyer et al.

[11] Patent Number: 5,055,019
[45] Date of Patent: Oct. 8, 1991

[54] PROCESS FOR THE PRODUCTION OF BOEHMITIC ALUMINAS

[75] Inventors: Arnold Meyer, Michaelisdonn; Klaus Noweck, Brunsbuttel; Ansgar Reichenauer, Marne, all of Fed. Rep. of Germany

[73] Assignee: Condea Chemie GmbH, Brunsbuttel, Fed. Rep. of Germany

[21] Appl. No.: 360,311

[22] Filed: Jun. 2, 1989

[30] Foreign Application Priority Data

Jul. 14, 1988 [DE] Fed. Rep. of Germany ....... 3823895

[51] Int. Cl.$^5$ ............................................. C01F 7/02
[52] U.S. Cl. .................................. 423/625; 423/628
[58] Field of Search ............... 423/127, 628, 629, 625; 502/8

[56] References Cited

U.S. PATENT DOCUMENTS

| | | | |
|---|---|---|---|
| 3,357,791 | 12/1967 | Napier | 423/625 |
| 3,394,990 | 7/1968 | Weingaertner et al. | 423/625 |
| 3,898,322 | 8/1975 | Leach | 423/628 |
| 3,966,893 | 6/1976 | Derolf | 423/628 |
| 3,975,231 | 8/1976 | Ziegenhain et al. | 423/628 |
| 4,098,874 | 7/1978 | Mitsche | 423/628 |
| 4,175,118 | 11/1979 | Wassermann | 423/630 |
| 4,179,411 | 12/1979 | Broersma et al. | 423/628 |
| 4,224,302 | 9/1980 | Okamoto | 423/628 |
| 4,248,852 | 2/1981 | Wakabayashi et al. | 423/630 |

FOREIGN PATENT DOCUMENTS

| | | |
|---|---|---|
| 1483002 | 6/1967 | France . |
| 1169096 | 10/1969 | United Kingdom . |
| 1226012 | 3/1971 | United Kingdom . |
| 1300684 | 12/1972 | United Kingdom . |

Primary Examiner—Michael L. Lewis
Assistant Examiner—Steven Bos

[57] ABSTRACT

A process for the preparation of boehmitic alumina compounds having a purity of, at least, 99.95% $Al_2O_3$. The compounds produced according to the invention have a pore radii in the range of 3 to 100 nm. The preparation of such compounds is carried out by, first, obtaining an alumina suspension from a neutral aluminum alkoxide hydrolysis and, then, aging the alumina suspension in an autoclave, preferably, at a steam pressure of 1 to 30 bar, corresponding to a temperature of 100° C. to 235° C., for between 0.5 and 20 hours. The aging step of the invention is preferably carried out with stirring at a peripheral speed of 1 to 6 m/s.

8 Claims, 5 Drawing Sheets

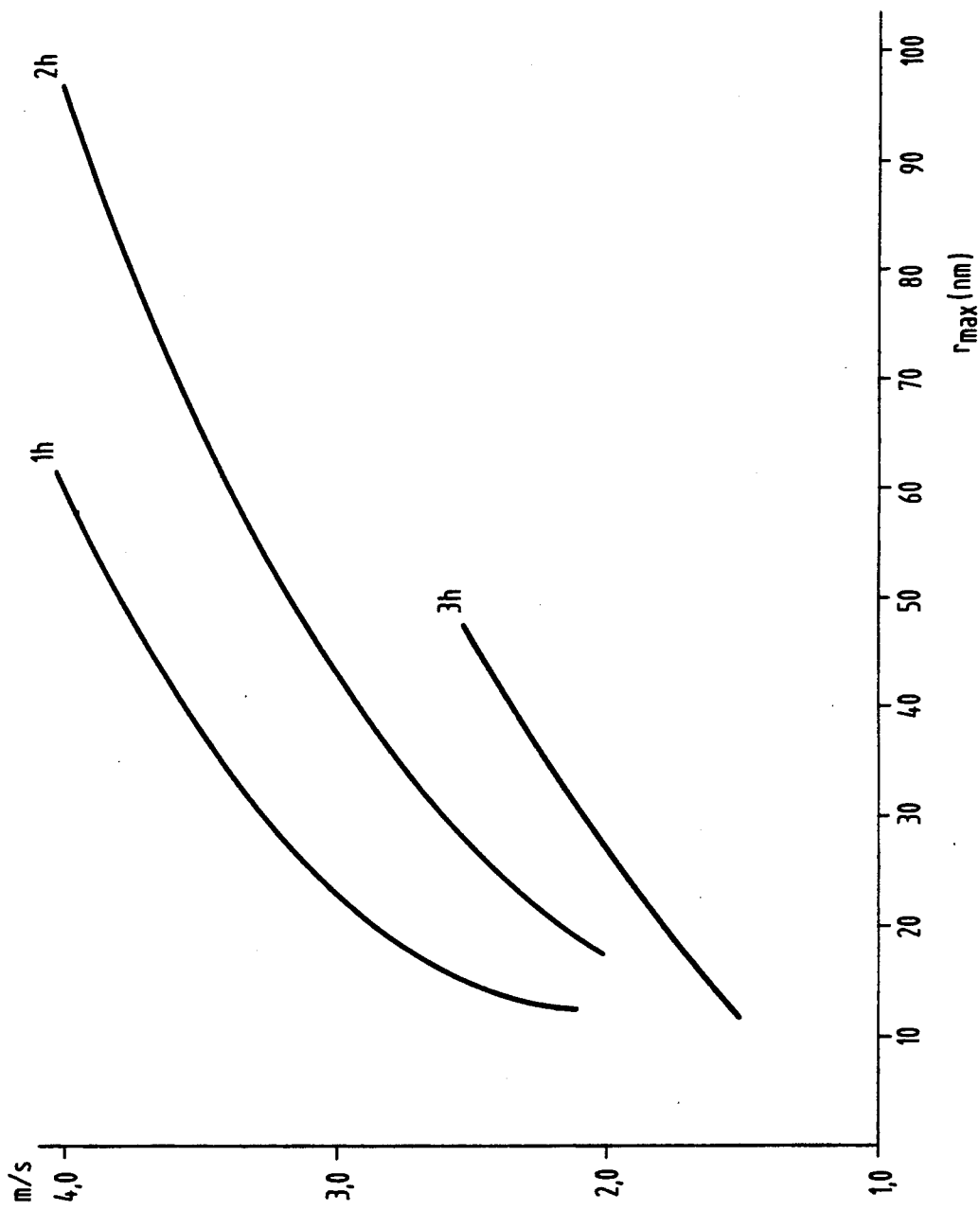

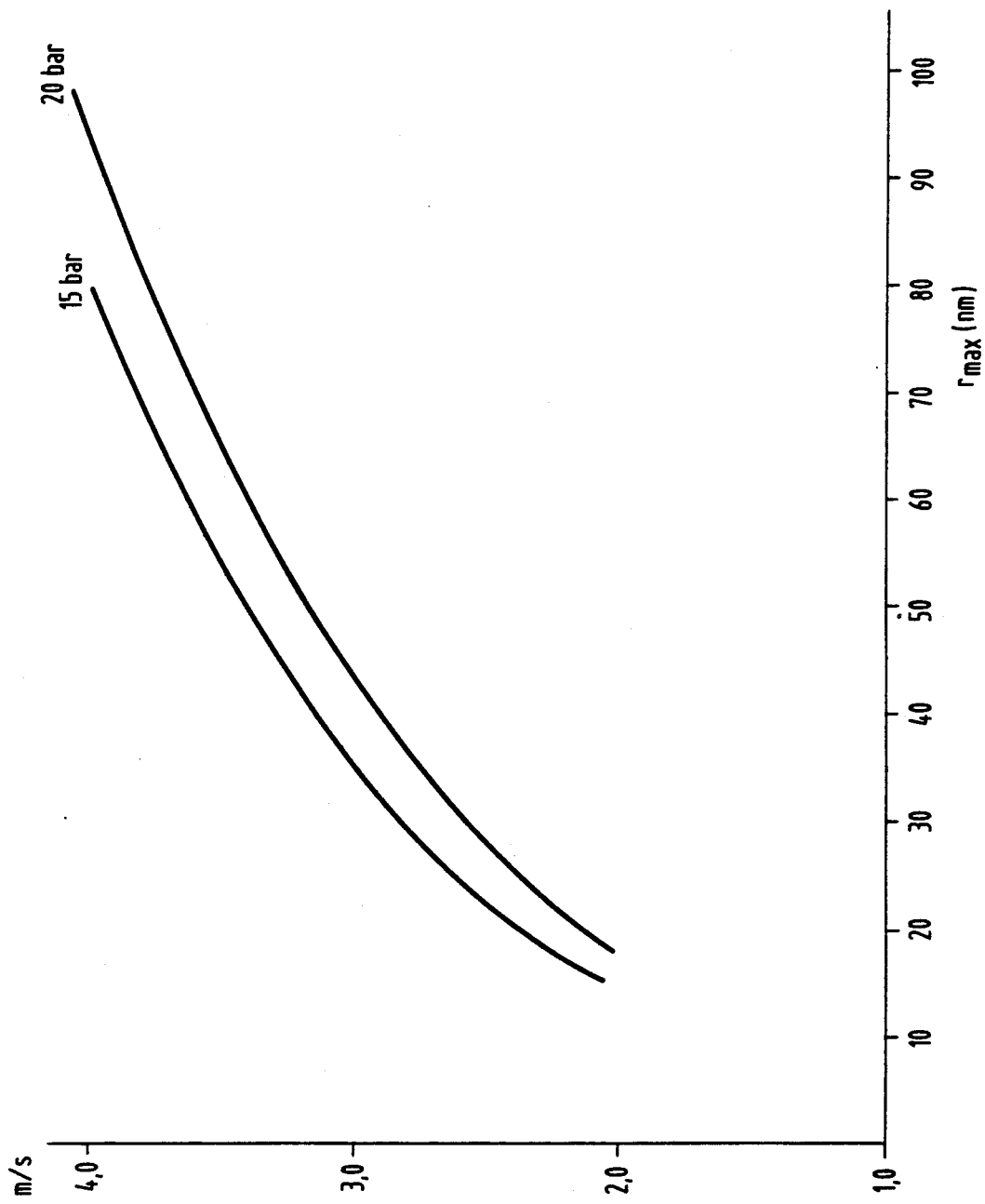

PROCESS FOR THE PRODUCTION OF BOEHMITIC ALUMINAS

The present invention relates to a process for the production of boehmitic aluminas. More particularly, the invention relates to the production of boehmitic alumina compounds having a purity of at least 99.95% $Al_2O_3$ with specific, adjustable pore radii of between 3 and 100 nm.

In the neutral hydrolysis of aluminum alkoxides, e.g., as described in DE-AS 1 258 854, aluminas with a boehmite structure or α-aluminum oxide monohydrate are obtained. The products obtained have a maximum pore radius of 2 to 4 nm and can be used as pigments, fillers, polishing agents and catalyst carriers. However, it is particularly desirable, in the case of carrier materials for catalysts and for separating gaseous components, that such aluminas are obtained with a pore volume or with pore radii in a specific range. It is particularly desirable to increase the pore volume of such aluminas and also to increase the pore radius, while maintaining a very narrow pore radius distribution.

In order to obtain a maximum pore radius, it has been possible to increase the pore radius or volume, e.g., according to German patent 2 556 804, by adding ammonium hydrogen carbonate, or as described in German patent 23 14 350, by treating with $C_1$ to $C_4$-alcohols, or as taught in German patent 29 32 648, by a repeated pH-value change during precipitation. Quite apart from the fact that such processes introduce impurities, they make it impossible to obtain clearly defined pore radius distributions set in a planned manner. It is also known from British patents 1 169 096 and 1 226 012 how to obtain a crystal growth and, therefore, an increase in the pore radii by aging the precipitated alumina. However, also in the case of these aluminas precipitated from sodium aluminate with nitric acid, a very wide pore maximum is obtained and, even then, only after a long preliminary aging procedure, lasting roughly 7 days, and subsequent calcining at 210° to 220° C. for 15 hours.

It is, therefore, an object of the present invention to provide a process for the more efficient preparation of boehmite alumina compounds or α-aluminum oxide monohydrate compounds, having a high purity level and a specific, variable pore radius distribution for, preferably, continuous use on an industrial scale.

The foregoing and related objects are achieved by a process for the preparation of boehmitic alumina and α-aluminum oxide monohydrate compounds, having variable pore radii in the range of 3 to 100 nm, in which alumina suspensions from neutral aluminum hydroxide are aged in an autoclave at a steam pressure of 1 to 30 bar, corresponding to a temperature at 100° to 235° C. This procedure is, preferably, carried out for between 0.5-20 hours and is preferably accompanied by stirring at a peripheral speed of 1.0-6.0 m/s.

It has surprisingly been found that under the foregoing process conditions for the after-treatment of alumina suspensions from neutral aluminum alkoxide hydrolysis, that boehmitic aluminas with the desired purity and specific pore radii are obtained. It is particularly surprising that the desired pore radius maximum is controlled through the degree of stirring used; expressed in the peripheral speed of 1.0 to 6.0 and preferably 1.15 to 5.2 m/s. As shown in the examples, the stirring is continued until the surface area is not more than 170 $m^2/g$. The examples also show that stirring can be continued until the surface area is as low as 78 $m^2/g$. As can be seen from the examples and the tables, the pore volume generally increases when measured over a pore radii range of 2 to 300 nm.

Preferably such stirring takes place in a cascade reactor with 2 to 10, and preferably 4 to 10, stages. Preferably, the reactor is equipped with a continuously adjustable stirrer.

The present invention will now be described in greater detail with reference being made to the following examples and drawing figures. It should, however, be recognized that the following examples are given by way of illustration and are not intended as defining the scope of the present invention.

EXAMPLE 1

Figure 1:
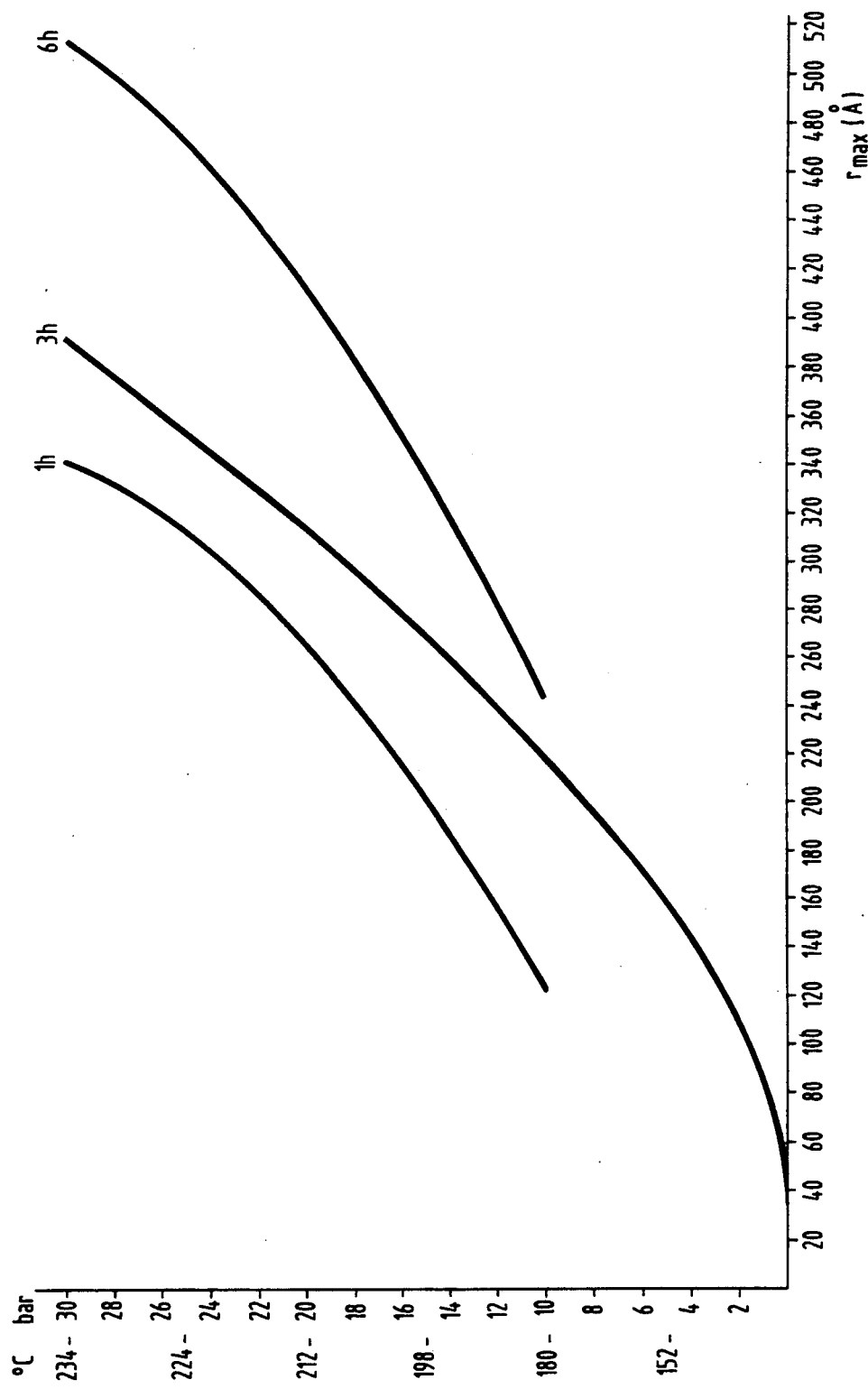
FIGS. 1 and 2 graphically illustrate the pore radii obtained in Examples 1-3, which follow, as a function of the residence time and pressure.

The starting product used was an alumina suspension or slurry resulting from neutral aluminum alkoxide hydrolysis and prepared in the following manner: An aluminum alkoxide mixture, such as obtained as an intermediate during the synthesis of the Ziegler/Alfol process, was hydrolyzed at 90° C. in a stirring vessel with water from which the impurity ions were removed by means of a complete softening plant. Two immiscible phases formed, i.e., an upper alcohol phase and a lower alumina/water phase. The alumina/water phase contained aluminum hydroxide with an $Al_2O_3$ content of 10 to 11%. A pure aluminum alkoxide can be used in place of the alkoxide mixture. The hydrolysis can generally be performed in a temperature range from 30° to 110° C., and preferably 60° to 100° C.

50 kg of this alumina suspension containing 10 to 11% by weight $Al_2O_3$ were added to a reactor in a batchwise operation, at a reactor pressure of 5 bar and at 125° C. After setting the reaction conditions, aging took place for 0.5 hours using a conventional stirrer with a peripheral speed of 2.30 m/s, corresponding to a stirrer speed of 200 rpm. The pore radius distribution was measured cumulatively in a conventional manner by mercury porosimetry following sample preparation for 3 hours at 550° C. The following equation was used for evaluation purposes:

$$D = -\left(\frac{1}{p} \cdot 4 \cos 0\right),$$

in which, D is the pore diameter, p is pressure, and O the contact angle.

The following data were obtained after spray drying the slurry:

| Analytical Data of the Alumina | |
| --- | --- |
| Pore radius distribution: | |
| 4 nm | 0.11 ml/g |
| 6 nm | 0.18 ml/g |
| 8 nm | 0.32 ml/g |
| 10 nm | 0.64 ml/g |
| 15 nm | 0.73 ml/g |
| 20 nm | 0.75 ml/g |
| 30 nm | 0.75 ml/g |
| 40 nm | 0.76 ml/g |
| 50 nm | 0.77 ml/g |
| 100 nm | 0.78 ml/g |
| 500 nm | 0.82 ml/g |
| Pore volume maximum at pore radius: | 9 nm |
| $Al_2O_3$ | 77.5% |
| $SiO_2$ | approx. 0.01% |
| $Fe_2O_3$ | approx. 0.01% |
| $TiO_2$ | approx. 0.006% |
| Alkaline and earth alkaline elements | approx. 0.005% |
| Other elements | approx. 0.01% |
| Bulk density | 0.54 g/ml |
| Surface area (3 h/550° C.) | 170 m²/g |
| Crystallite size (021 Reflex) | 200Å |

EXAMPLE 2

The procedure as in Example 1 was repeated, except the residence time was doubled, i.e. set to 1 hour, and the reactor pressure was 15 bar at 198° C.

The stirring speed was 200 rpm, i.e., or the peripheral speed of the stirrer was 2.30 m/s. The following analytical data were obtained after spray drying the slurry:

| Analytical Data of the Alumina | |
| --- | --- |
| Pore radius distribution: | |
| 4 nm | 0.01 ml/g |
| 10 nm | 0.03 ml/g |
| 15 nm | 0.11 ml/g |
| 20 nm | 0.28 ml/g |
| 25 nm | 0.55 ml/g |
| 30 nm | 0.86 ml/g |
| 40 nm | 0.74 ml/g |
| 50 nm | 0.78 ml/g |
| 100 nm | 0.90 ml/g |
| 500 nm | 1.19 ml/g |
| Pore volume maximum at pore radius: | 27 nm |
| $Al_2O_3$ | 78.6% |
| $SiO_2$ | approx. 0.01% |
| $Fe_2O_3$ | approx. 0.01% |
| $TiO_2$ | approx. 0.005% |
| Alkaline and earth alkaline elements | approx. 0.005% |
| Other elements | approx. 0.01% |
| Bulk density | 0.21 g/ml |
| Surface | 105 m²/g |
| Crystallite (021 reflex) | 280Å |

EXAMPLE 3

The procedures of Examples 1 and 2 were again repeated, however, the residence time was 3 hours after setting the reactor conditions. The reactor pressure was 23 bar at 220° C.

The following analytical data were obtained:

| | |
| --- | --- |
| 4 nm | 0.02 ml/g |
| 10 nm | 0.03 ml/g |
| 20 nm | 0.10 ml/g |
| 30 nm | 0.39 ml/g |
| 40 nm | 0.79 ml/g |
| 50 nm | 0.86 ml/g |
| 100 nm | 1.04 ml/g |
| 500 nm | 1.52 ml/g |
| Pore volume maximum at pore radius: | 41 nm |
| $Al_2O_3$ | 80.5% |
| $SiO_2$ | approx. 0.01% |
| $Fe_2O_3$ | approx. 0.01% |
| $TiO_2$ | approx. 0.005% |
| Alkaline and earth alkaline elements | approx. 0.005% |
| Other elements | approx. 0.01% |
| Bulk density | 0.12 g/ml |
| Surface | 93 m²/g |
| Crystallite (021 reflex) | 400Å |

Figure 2:
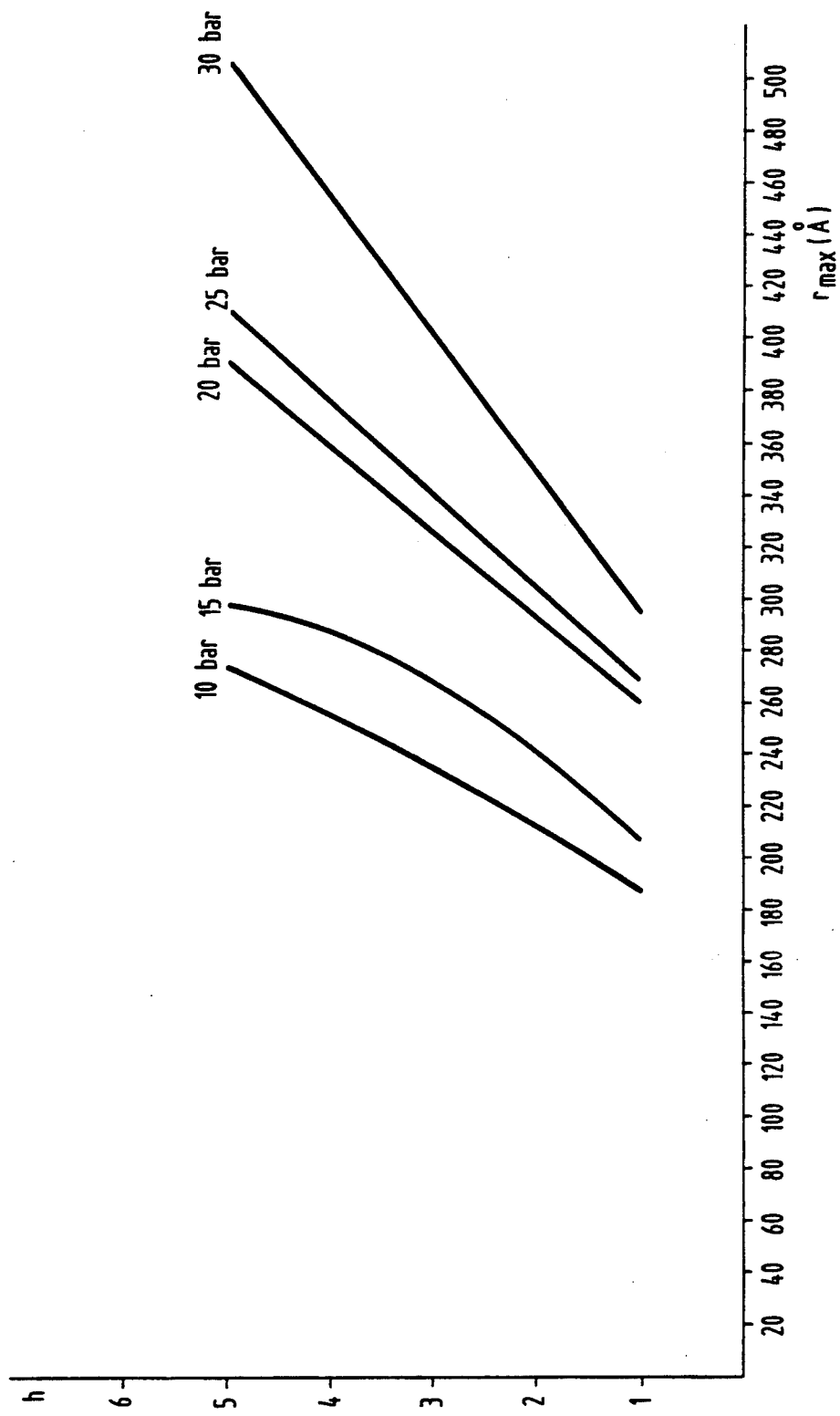

The pore radii obtained according to Examples 1 to 3, as a function of the residence time and pressure are given in the accompanying FIGS. 1 and 2. The results graphically illustrate in FIGS. 1 and 2 that the pore maximum of the alumina can be accurately set as a function of the residence time and pressure during aging, and in the case of simultaneous stirring.

EXAMPLE 4

Figure 3:
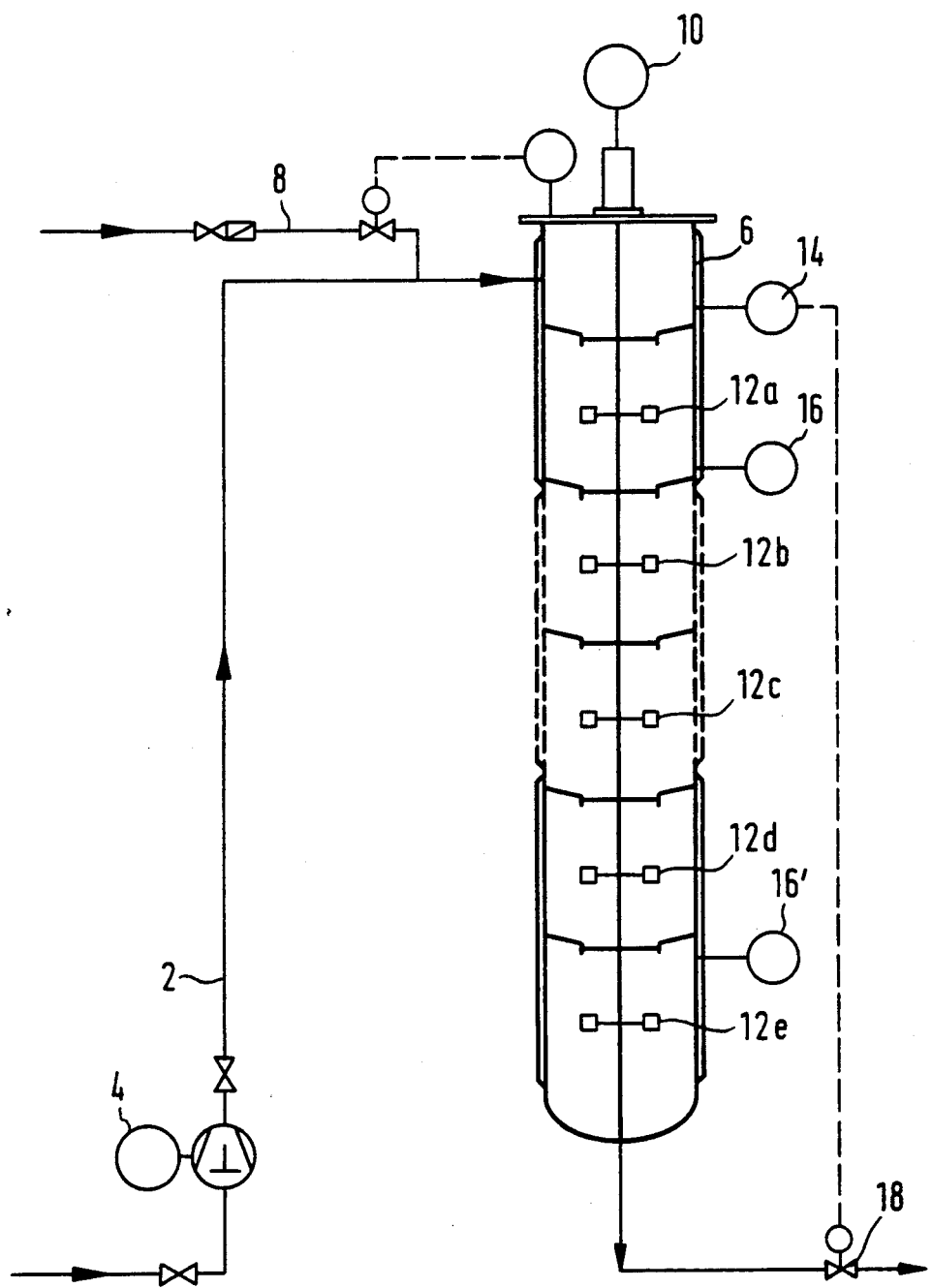
FIG. 3 schematically illustrates a preferred reactor system for use in carrying out the process of the present invention; and, FIGS. 4 and 5 graphically illustrate the comparative test results obtained in Examples 4 and 5, which follow hereinafter.

An alumina suspension, according to Example 1, with a concentration of approximately 10% by weight $Al_2O_3$ was continuously fed into and stirred in a reactor according to FIG. 3. The reactor shown in FIG. 3 has 5 stirring stages arranged in cascade-like manner. The alumina slurry is fed from above via a line 2 and a pump 4 into reactor 6 and simultaneously steam is supplied under pressure by means of a line 8. The stirred autoclave is driven by a motor 10 and in the present embodiment has five cascade-like, superimposed stirrers (12a-12e) with interposed trays or plates which permit a regulated passage from one cascade chamber into the chamber located below it. By means of a level regulator 14 and several temperature sensors 16, 16', it is possible to ensure the maintenance of a uniform reaction sequence; the product entry and steam supply being controlled as a function of the product discharge 18.

The residence time in the present Example was varied at 1, 2 and 3 hours. The reactor pressure was 20 bar at 212° C. The stirrer speed, and therefore the peripheral speed of the stirrer, was correspondingly varied and, after spray drying, the aluminas obtained had the characteristics given in Table 1.

EXAMPLE 5

Working took place as in Example 4, but at 15 bar and a residence time of 2 hours. The corresponding values are given in Table 2. The graphs in FIGS. 4 and 5 correspond to Examples 4 and 5.

While only several examples and embodiments of the present invention have been shown and described, it will be obvious to those of ordinary skill in the art that many modifications may be made thereunto without departing from the spirit and scope thereof.

TABLE 1

| Pressure Aging of Alumina Slurry at a Reactor Pressure of 20 bar and Residence Times of 1, 2 and 3 h | | | | | | | | | | | |
| --- | --- | --- | --- | --- | --- | --- | --- | --- | --- | --- | --- |
| Peripheral Speed | Stirrer Speed | $Al_2O_3$ | Bulk Density | Surface | Crystallite Size | Dispersibility | Pore Volume ml/g at Pore Radius of: | | | | |
| | | | | | | | nm | nm | nm | nm | nm |

TABLE 1-continued

Pressure Aging of Alumina Slurry at a Reactor Pressure of 20 bar and Residence Times of 1, 2 and 3 h

| m/s | min⁻¹ | % | g/ml | m²/g | nm | % | 2 | 5 | 10 | 15 | 20 |
|---|---|---|---|---|---|---|---|---|---|---|---|
| (1) Residence time: 1 h | | | | | | | | | | | |
| 2.07 | 180 | 81.6 | 0.46 | 112 | 25 | 95.5 | 0.01 | 0.04 | 0.22 | 0.56 | 0.60 |
| 2.53 | 220 | 81.9 | 0.37 | 101 | 32 | 92.6 | 0.01 | 0.05 | 0.14 | 0.40 | 0.51 |
| 3.05 | 265 | 81.4 | 0.23 | 100 | 33 | 94.6 | 0.02 | 0.09 | 0.15 | 0.25 | 0.46 |
| 4.03 | 350 | 82.6 | 0.21 | 101 | 62 | 47.0 | 0.01 | 0.08 | 0.13 | 0.16 | 0.20 |
| (2) Residence time: 2 h | | | | | | | | | | | |
| 2.07 | 180 | 80.7 | 0.25 | 91 | 39 | 95.0 | 0.01 | 0.04 | 0.09 | 0.20 | 0.44 |
| 2.53 | 220 | 81.1 | 0.22 | 89 | 50 | 89.8 | 0.02 | 0.08 | 0.12 | 0.17 | 0.28 |
| 3.05 | 265 | 81.7 | 0.15 | 86 | 50 | 89.6 | 0.03 | 0.13 | 0.18 | 0.21 | 0.24 |
| 4.03 | 350 | 80.7 | 0.14 | 78 | 62 | 46.6 | 0.01 | 0.09 | 0.14 | 0.16 | 0.17 |
| (3) Residence time: 3 h | | | | | | | | | | | |
| 1.55 | 135 | 80.8 | 0.41 | 117 | 24 | 97.5 | — | 0.04 | 0.20 | — | 0.55 |
| 2.07 | 180 | 82.5 | 0.24 | 93 | 47 | 93.3 | 0.01 | 0.05 | 0.09 | 0.13 | 0.24 |
| 2.53 | 220 | 83.4 | 0.13 | 81 | 45 | 88.0 | 0.01 | 0.09 | 0.12 | 0.13 | 0.15 |

| Peripheral Speed m/s | Stirrer Speed min⁻¹ | Pore Volume ml/g at Pore Radius of: | | | | | | | | | | | Max. Pore Volume at Pore Radius nm |
|---|---|---|---|---|---|---|---|---|---|---|---|---|---|
| | | nm 25 | nm 30 | nm 35 | nm 40 | nm 45 | nm 50 | nm 75 | nm 80 | nm 100 | nm 300 | nm 500 | |
| (1) Residence time: 1 h | | | | | | | | | | | | | |
| 2.07 | 180 | 0.62 | 0.63 | 0.64 | 0.65 | 0.65 | 0.66 | 0.67 | 0.67 | 0.68 | 0.71 | 0.76 | 12 |
| 2.53 | 220 | 0.54 | 0.57 | 0.58 | 0.59 | 0.60 | 0.61 | 0.65 | 0.65 | 0.66 | 0.75 | 0.87 | 16 |
| 3.05 | 265 | 0.73 | 0.80 | 0.83 | 0.86 | 0.88 | 0.89 | 0.96 | 0.96 | 0.99 | 1.15 | 1.31 | 23 |
| 4.03 | 350 | 0.24 | 0.28 | 0.32 | 0.36 | 0.41 | 0.46 | 0.81 | 0.89 | 0.95 | 1.12 | 1.17 | 60 |
| (2) Residence time: 2 h | | | | | | | | | | | | | |
| 2.07 | 180 | 0.55 | 0.60 | 0.63 | 0.65 | 0.67 | 0.69 | 0.74 | 0.74 | 0.77 | 0.94 | 1.10 | 18 |
| 2.53 | 220 | 0.49 | 0.65 | 0.76 | 0.81 | 0.82 | 0.85 | 0.91 | 0.92 | 0.96 | 1.17 | 1.30 | 30 |
| 3.05 | 265 | 0.29 | 0.37 | 0.48 | 0.61 | 0.72 | 0.87 | 1.01 | 1.02 | 1.06 | 1.28 | 1.40 | 44 |
| 4.03 | 350 | 0.18 | 0.20 | 0.22 | 0.23 | 0.25 | 0.27 | 0.44 | 0.49 | 0.85 | 1.33 | 1.47 | 96 |
| (3) Residence time: 3 h | | | | | | | | | | | | | |
| 1.55 | 135 | — | 0.59 | — | 0.60 | — | 0.61 | — | — | 0.64 | — | 0.78 | 12 |
| 2.07 | 180 | 0.41 | 0.52 | 0.58 | 0.63 | 0.67 | 0.70 | 0.79 | 0.80 | 0.83 | 0.99 | 1.06 | 31 |
| 2.53 | 220 | 0.20 | 0.25 | 0.36 | 0.48 | 0.62 | 0.82 | 0.93 | 0.94 | 0.98 | 1.21 | 1.34 | 47 |

TABLE 2

Pressure Aging of Alumina Slurry at a Reactor Pressure of 15 Bar and Residence Times of 2 h

| Peripheral Speed m/s | Stirrer Speed min⁻¹ | Al₂O₃ % | Bulk Density g/ml | Surface m²/g | Crystallite Size nm | Dispersibility % | Pore Volume ml/g at Pore Radius of: | | | | | | |
|---|---|---|---|---|---|---|---|---|---|---|---|---|---|
| | | | | | | | nm 2 | nm 5 | nm 10 | nm 15 | nm 20 | nm 25 | nm 30 |
| 2.07 | 180 | 81.1 | 0.37 | 132 | 25 | 96.9 | 0.01 | 0.06 | 0.20 | 0.53 | 0.67 | 0.71 | 0.73 |
| 2.53 | 220 | 81.6 | 0.34 | 103 | 35 | 95.6 | 0.01 | 0.05 | 0.09 | 0.16 | 0.32 | 0.60 | 0.72 |
| 3.05 | 265 | 82.4 | 0.18 | 107 | 42 | 87.4 | 0.02 | 0.10 | 0.15 | 0.18 | 0.23 | 0.30 | 0.38 |
| 4.03 | 350 | 82.6 | 0.13 | 96 | 60 | 41.0 | 0.02 | 0.09 | 0.14 | 0.16 | 0.17 | 0.19 | 0.22 |

| Peripheral Speed m/s | Stirrer Speed min⁻¹ | Pore Volume ml/g at Pore Radius of: | | | | | | | | | Max. Pore Volume at Pore Radius nm |
|---|---|---|---|---|---|---|---|---|---|---|---|
| | | nm 35 | nm 40 | nm 45 | nm 50 | nm 75 | nm 80 | nm 100 | nm 300 | nm 500 | |
| 2.07 | 180 | 0.75 | 0.76 | 0.77 | 0.77 | 0.79 | 0.80 | 0.80 | 0.85 | 0.93 | 14 |
| 2.53 | 220 | 0.75 | 0.77 | 0.79 | 0.80 | 0.86 | 0.87 | 0.89 | 0.98 | 0.02 | 23 |
| 3.05 | 265 | 0.48 | 0.65 | 0.79 | 0.89 | 1.00 | 1.01 | 1.05 | 1.23 | 1.30 | 40 |
| 4.03 | 350 | 0.23 | 0.26 | 0.29 | 0.34 | 0.78 | 1.01 | 1.12 | 1.43 | 1.58 | 75 |

What is claimed is:

1. A process for the preparation of a boehmitic alumina compound, comprising the steps of:

hydrolysizing a mixture consisting essentially of neutral aluminum alkoxide and alcohol and water to obtain an alumina suspension; and aging the alumina suspension obtained from the neutral aluminum alkoxide hydrolysis in an autoclave having a steam pressure of 1 to 30 bar, at a temperature of 100°–235° C., for between 0.5–20 hours;

said aging step being carried out with stirring at a peripheral speed of 1–6 m/s;

controlling the stirrer speed until the surface area of said boehmitic alumina compound is between 170 m²/g and 78 m²/g, as determined on the dried alumina suspension; and said alumina compound having a purity of at least 99.95% Al₂O₃ and a generally increasing pore volume at pore radii measured in a range of 2 to 300 nm.

2. The process according to claim 1, wherein the alumina suspension obtained in said hydrolysizing step is 5-15%, by weight, $Al_2O_3$.

3. The process according to claim 1, wherein the alumina suspension obtained is aged in said aging step at a steam pressure of 5-30 bar, accompanied by stirring for 1 to 4 hours.

4. The process according to claim 1, wherein the aging step is carried out with stirring at a peripheral speed of 1.15 to 5.2 m/s.

5. The process according to claim 1, wherein the aging step is carried out with stirring at a peripheral speed of 1.55 to 4.03 m/s.

6. The process according to claim 1, further comprising spray drying the alumina suspension after said aging step.

7. A process for the preparation of a boehmitic alumina compound comprising the steps of:

hydrolysizing a mixture consisting essentially of neutral aluminum alkoxide and alcohol and water to obtain an alumina suspension; and aging the alumina suspension obtained from the neutral aluminum alkoxide hydrolysis in an autoclave having a steam pressure of 1 to 30 bar, at to a temperature of 100°-235° C., for between 0.5-20 hours;

said aging step being carried out with stirring at a peripheral speed of 1-6 m/s;

controlling the stirrer speed until the surface area of said boehmitic alumina compound is between 170 $m^2/g$ and 78 $m^2/g$, as determined on the dried alumina suspension; and said alumina compound having a purity of at least 99.95% $Al_2O_3$ and a controlled maximum of pore radius and a generally increasing pore volume at pore radii measured in a range of 2 to 300 nm; and said suspension obtained in said hydrolyzing step is continuously aged in a cascade reactor with a two to ten stage stirrer at said peripheral speed of 1-6 m/s.

8. A process for the preparation of a boehmitic alumina compound, comprising the steps of:

hydrolysizing a mixture consisting essentially of neutral aluminum alkoxide and alcohol and water to obtain an alumina suspension; and aging the alumina suspension obtained from the neutral aluminum alkoxide hydrolysis in an autoclave having a steam pressure of 1 to 30 bar, at a temperature of 100°-235° C., for between 0.5-20 hours;

said aging step being carried out with stirring at a peripheral speed of 1-6 m/s;

controlling the stirrer speed until the surface area of said boehmitic alumina compound is between 170 $m^2/g$ and 78 $m^2/g$, as determined on the dried alumina suspension; and said alumina compound having a purity of at least 99.95% $Al_2O_3$ and a controlled maximum of pore radius and a generally increasing pore volume at pore radii measured in a range of 2 to 300 nm.

* * * * *